United States Patent [19]

Quesnoit

[11] 4,383,421
[45] May 17, 1983

[54] REFRIGERATION UNIT COMPRISING COMPARTMENTS AT DIFFERENT TEMPERATURES

[75] Inventor: Jacques Quesnoit, Paris, France

[73] Assignee: Thomson-Brandt, Paris, France

[21] Appl. No.: 281,852

[22] Filed: Jul. 9, 1981

[30] Foreign Application Priority Data

Jul. 11, 1980 [FR] France .................................. 80 15495

[51] Int. Cl.³ .............................................. F25D 17/00
[52] U.S. Cl. ........................................ 62/333; 62/334; 62/442
[58] Field of Search .................. 62/333, 334, 335, 442

[56] References Cited

U.S. PATENT DOCUMENTS

| | | | |
|---|---|---|---|
| 2,401,460 | 6/1946 | Charland | 62/334 |
| 2,416,777 | 3/1947 | Schweller | 62/334 |
| 2,455,850 | 12/1948 | Atchison | 62/333 X |
| 2,471,137 | 5/1949 | Atchison . | |
| 2,511,851 | 6/1950 | Iwashita . | |
| 2,531,136 | 11/1950 | Kurtz . | |
| 2,562,811 | 7/1951 | Muffly | 62/334 X |
| 2,581,044 | 1/1952 | Ratcliff | 62/333 X |
| 2,617,271 | 11/1952 | Nolcken | 62/334 |
| 2,791,101 | 5/1957 | Zearfoss, Jr. . | |
| 2,946,206 | 7/1960 | Hellstrom | 62/334 |
| 3,985,182 | 10/1976 | Hara et al. | 62/333 X |
| 4,258,554 | 3/1981 | Asselman et al. | 62/333 X |
| 4,288,993 | 9/1981 | van Mensvoort et al. | 62/333 |

Primary Examiner—Lloyd L. King
Attorney, Agent, or Firm—Cushman, Darby & Cushman

[57] ABSTRACT

A refrigeration unit formed of compartments at different temperatures, separately regulated, comprising a refrigerant circuit equipped with a single motor-compressor, and composed of a primary circuit comprising a capillary tube and several evaporators, and a secondary circuit with a condenser and an evaporator, the condenser forming part of a heat exchanger with one of the primary circuit evaporators, and the evaporator, by a thermal valve effect, cooling the freezer compartment of the unit.

19 Claims, 15 Drawing Figures

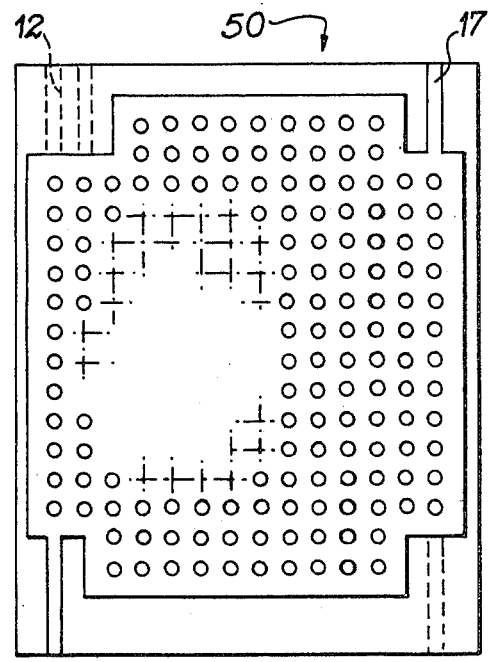
FIG. 7
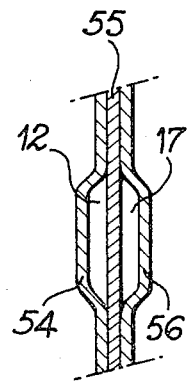
FIG. 8
FIG. 9
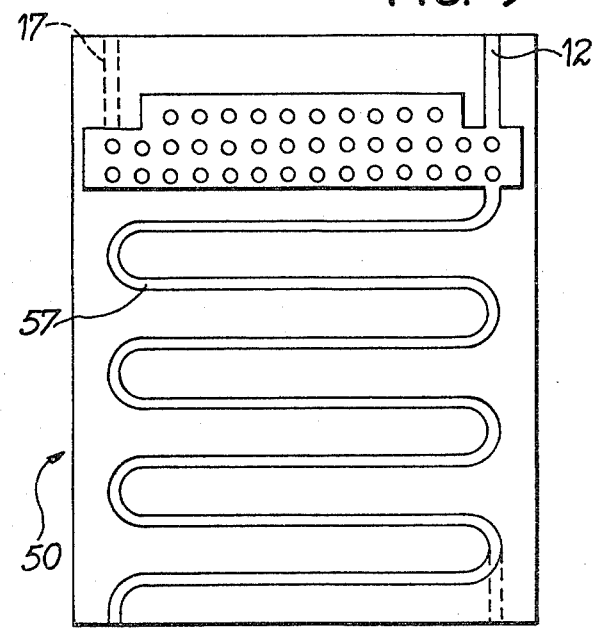
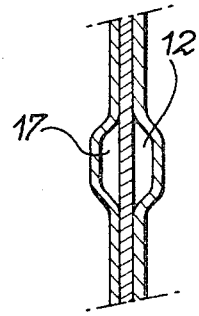
FIG. 10

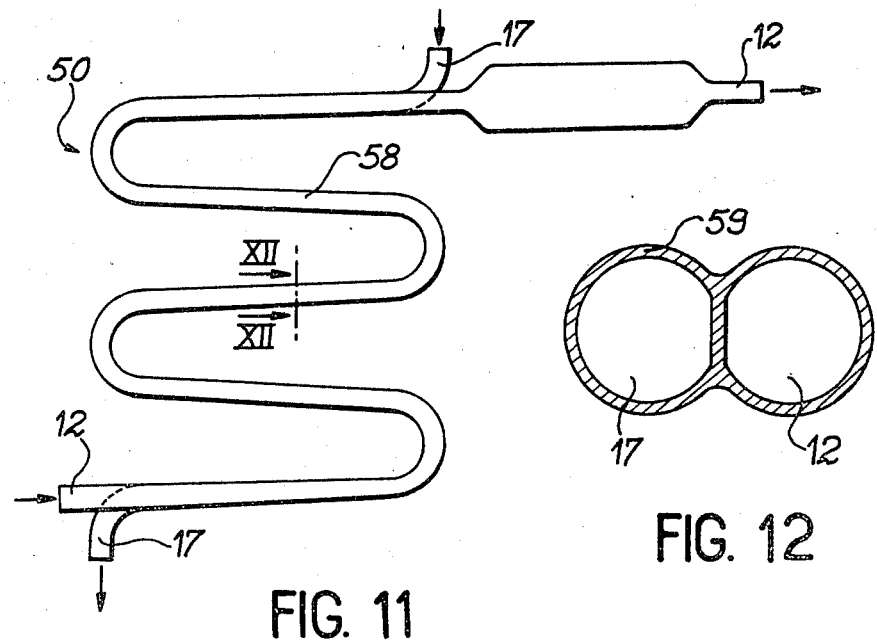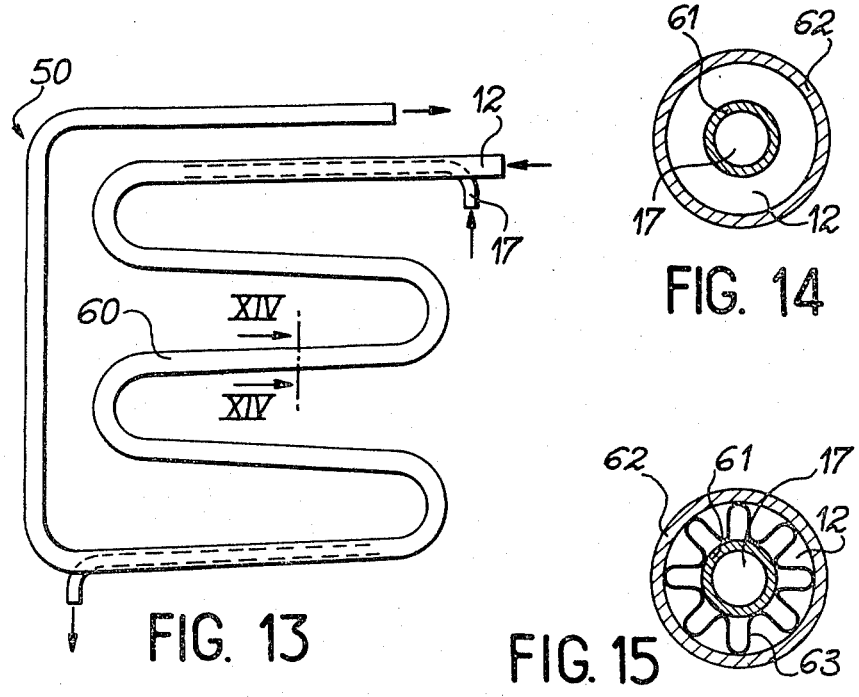

REFRIGERATION UNIT COMPRISING COMPARTMENTS AT DIFFERENT TEMPERATURES

BACKGROUND OF THE INVENTION

This invention concerns a refrigeration unit comprising compartments at different temperatures.

Such units usually take the form of a refrigerator, a deep-freeze, a refrigerated cabinet, or a cold-storage chamber. The commonest form is a refrigerator with two compartments, each kept at a relatively constant temperature by two evaporators with different temperature levels. There is a refrigerator compartment, kept at approximately +5° C., and a freezer compartment, kept at approximately −18° C.

Most existing refrigerators of this type operate on a single compressor, which cools the two evaporators, connected in series. Under this method, distribution of cold between the two compartments is governed by the construction of the refrigerator, and cannot be adapted to needs, which may vary, depending partly on use (opening of doors, insertion of products for cooling or freezing) and partly on atmospheric temperature. When this falls, not enough cold is produced in the freezer, so that the necessary −18° C. is not attained. This can be remedied by heating the refrigerator compartment with a resistance, or by ensuring that the compartments are properly balanced at temperatures of −18° C. and +5° C. for a given lowest outside temperature, for example +16° C.; in this case, however, an outside temperature of +32° C., for example, will result in temperatures of −23° C. and +5° C. Either solution, resistance or colder thermal balance, also means extra energy consumption; in addition, they function satisfactorily only within a restricted temperature range, and for a limited freezer capacity (approximately 25% of the total volume of the unit, with an absolute limit of about 100 liters).

Both compartments can also be cooled by evaporating the cold-generating fluid at the temperature needed for the colder compartment, but this means inefficient energy consumption.

Other refrigerators are equipped with two compressors, each supplying cold to one compartment. This ensures the right temperatures on both compartments, regardless of their volume ratio to each other, and allows them to be regulated separately. But it is much more expensive: such refrigerators consume at least as much energy as those mentioned earlier, since the fixed wastages from each compressor, although individually lower, are combined.

Many methods have been suggested for allowing two compartments to function independently, in a refrigerator equipped with only one compressor. Most of them involve an electro-valve, which halts one evaporator, usually the one cooling the refrigerator compartment, while the other continues to function. But this does not really provide the fully independent temperature regulation and stability because the cold circuit functions quite differently, depending on whether only one or both evaporators are being cooled, and in order to obtain reasonably adequate results, more sophisticated and consequently much more expensive regulation devices are needed.

Other suggestions involve a secondary circuit to cool the refrigerator compartment. This circuit is in thermal contact with the freezer compartment, and heat exchange in the circuit is controlled by an electro-valve or throttle, which can be heated to halt fluid circulation.

This solution does not provide the same level of independence between the two compartments as the use of two separate compressors and circuits, which allow temperatures to be regulated quite separately, with the freezer compartment kept functioning permanently, for deep-frozen products and to improve freezing.

In addition, the evaporation temperature of a single-compressor appliance is dictated by the requirements of the colder compartment, detracting from thermodynamic efficiency.

The drawbacks mentioned above are particularly noticeable in the case of refrigerating circuits in which a capillary tube is used to reduce the pressure of the refrigerant from a high level at the condenser outlet to a low level at the evaporator inlet or inlets; this is because the flow in a capillary tube is not stopped but varies to suit conditions prevailing on the high-pressure and low-pressure sides. The capillary tube possesses a self-regulating effect, which allows it to adapt to various conditions occurring during actual operation. This capacity, combined with its simplicity and reliability, has resulted in its widespread use for domestic refrigeration.

This invention provides a way of overcoming the drawbacks described, by proposing a refrigeration unit having compartments at different temperatures, separately regulated. In this unit, supplies of cold for each compartment are made independent of each other by means of a thermal valve, and temperature regulation is kept independent by alternate functioning; cold is generated for only one compartment at a time, allowing the temperature of each compartment to be kept more steady.

In a capillary system, such a result can be obtained only with the device described in this invention, using a system comprising a secondary circuit to cool the freezer compartment, acting as a thermal valve and comprising one section acting as evaporator and situated inside the freezer, and another section acting as condensor, and forming a heat exchanger with one of the primary circuit evaporators.

Expansion valves, controlled by the evaporation temperature or by other means, allow several compartments to be kept independent of one another more easily. These valves can be used to halt the flow of fluid, and thereby make the circuit function with a reserve of liquid, ensuring far greater independence of the compartments, each of which is regulated by a thermostatic valve. This method is used in commercial refrigeration. However, these expansion valves are far too expensive to be used in domestic refrigeration.

SUMMARY OF THE INVENTION

This invention concerns a refrigeration unit comprising compartments at relatively constant different temperatures, comprising a refrigerating circuit equipped with a single motor-compressor, and a primary circuit containing at least two evaporators, one of which cools the refrigerator compartment directly, while the other cools the freezer compartment, through a secondary circuit with condensor and evaporator, within which a refrigerant circulates by gravity, ensuring heat transfer from the primary circuit. This primary circuit evaporator forms a heat exchanger with the secondary circuit condensor; this heat exchanger is located above the secondary circuit evaporator, and heat transfer is possible only in one direction, producing a thermal valve effect. This means that the freezer compartment can receive cold from the primary circuit, but only when the temperature in the circuit is lower than in the compartment: otherwise, it remains isolated.

The evaporator in the refrigerator compartment has a large surface area, so that it evaporates at a higher temperature. When it is functioning, therefore, no cold is generated in the freezer compartment, which cannot receive cold unless the other evaporator is halted and the evaporation temperature falls sufficiently. The device thus functions alternately for each compartment.

BRIEF DESCRIPTION OF THE DRAWINGS

The invention will become clearer from the following description of a number of embodiments, illustrated by the accompanying figures:

FIG. 7, showing a diagrammatical plan of part of the refrigerant circuit of the refrigerator illustrated in FIG. 1, in the form of a heat exchanger;

FIG. 8, showing a diagrammatical cross-sectional view of part of the heat exchanger illustrated in FIG. 7, on a different scale;

FIG. 9, showing a diagrammatical plan of another embodiment of the heat exchanger illustrated in FIG. 7;

FIG. 10, showing a diagrammatical cross-section view of part of the heat exchanger illustrated in FIG. 9;

FIG. 11, showing a diagrammatical plan of another embodiment of the heat exchanger illustrated in FIG. 7, on a different scale;

FIG. 12, showing a diagrammatical cross-sectional view, along the line XII—XII of part of the heat exchanger illustrated in FIG. 11, on a different scale;

FIG. 13, showing a diagrammatical plan of another embodiment of the heat exchanger illustrated in FIG. 7, on a different scale;

FIG. 14, showing a diagrammatical cross-sectional view, along the line XIV—XIV of part of the heat exchanger illustrated in FIG. 13, on a different scale;

FIG. 15, showing a diagrammatical cross-sectional view of another embodiment of the heat exchanger illustrated in FIG. 13, on a different scale.

DETAILED DESCRIPTION OF THE PREFERRED EMBODIMENT

Figure 1:
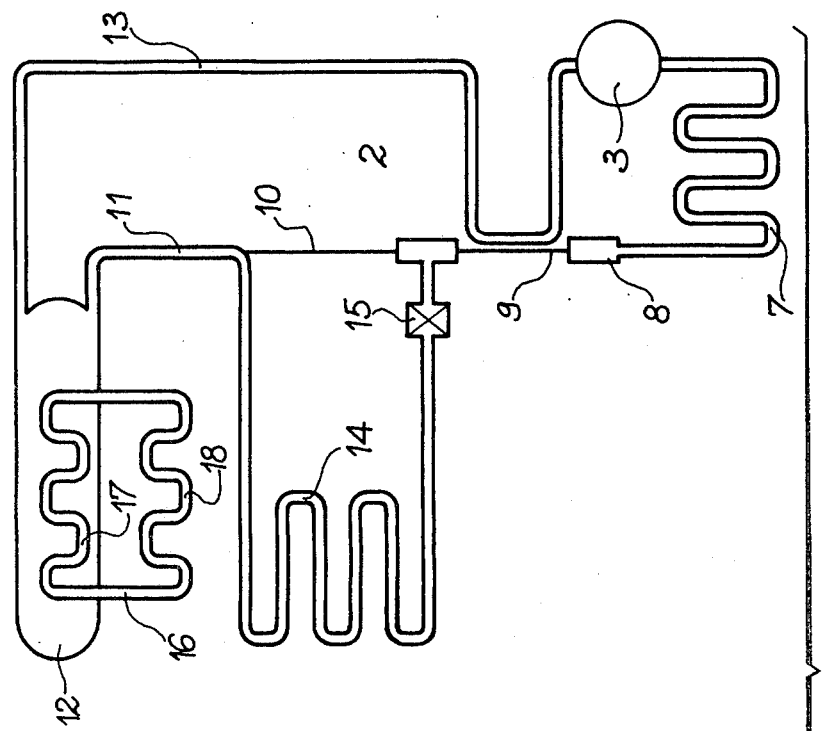
FIG. 1, showing a diagrammatical view of one embodiment of the new refrigeration unit, in the form of a refrigerator with two compartments, each at a different temperature.
Figure 1:
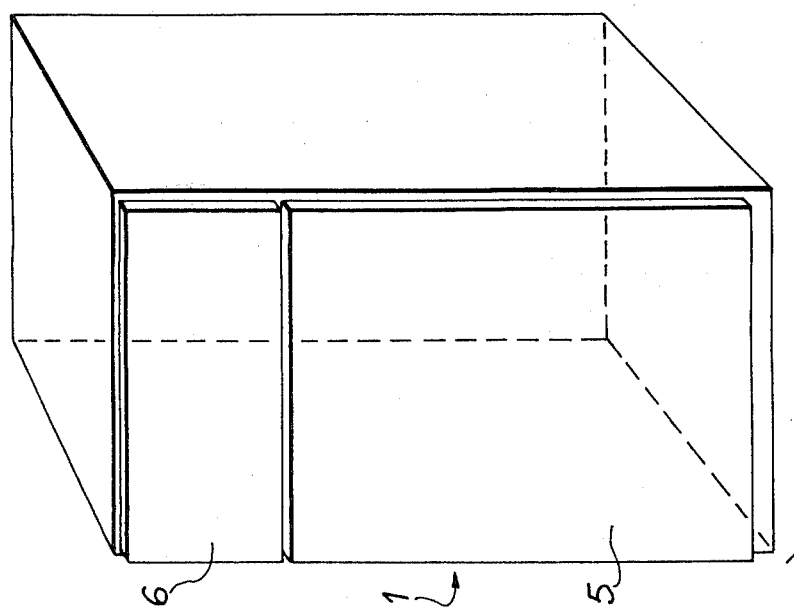
Figure 2:
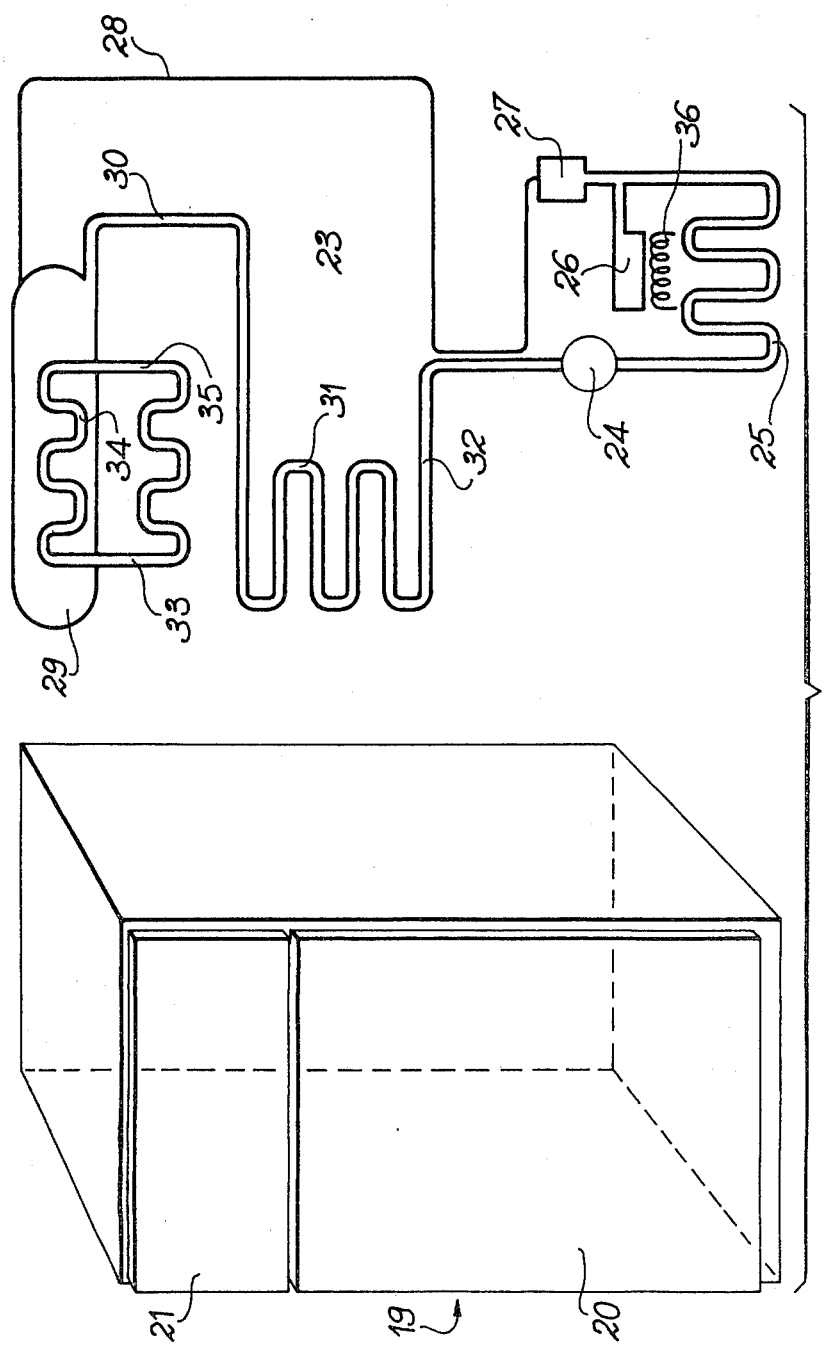
FIG. 2, showing a diagrammatical view of another embodiment of this new refrigeration unit, in the form of a refrigerator with two compartments, each at a different temperature.

FIGS. 1 and 2 show examples of a refrigeration unit 1 comprising two compartments, each kept at a different temperature. In such units, compartment temperatures are maintained by a capillary-type refrigerating circuit, equipped with one motor-compressor (reference: 3 on FIG. 1, 24 on FIG. 2). FIGS. 3 to 6 show the electrical circuit 4 used to regulate compartment temperatures in such a way as to keep them relatively steady. The refrigerating circuit (2 or 23) comprises at least two sections, consisting of separate closed circuits containing cold-producing fluids or refrigerants, respectively, and referred to as the primary and secondary circuits. The primary circuit comprises several evaporators, the number of which corresponds to the number of compartments in the refrigeration unit 1 or 19. The secondary circuit comprises a separate coil, a part of which acts as evaporator, while another part, acting as condensor, is in thermic heat exchange with one of the primary circuit evaporators and forms with the latter a heat exchanger. The secondary circuit contains a cold-producing fluid or refrigerant for the exchange between the two parts of the secondary circuit. The secondary circuit fluid circulates by gravity or a thermosiphon effect, transferring cold from the condensor section in thermic relation with part of the said heat exchanger acting as evaporator to the evaporator section located in one of the compartments of the refrigeration unit, inside one of the refrigeration compartments. The heat exchanger is situated above the evaporator section of the secondary circuit. When the heat exchanger is colder than this evaporator section of the secondary circuit, refrigerant vapor inside the condensor section of the secondary circuit, forming part of the heat exchanger, condenses, and the resulting liquid refrigerant redescends to the evaporator section of the circuit, where it evaporates, generating cold. Heat transfer thus occurs. On the other hand, when the evaporator section of the secondary circuit is colder than the heat exchanger, the liquid refrigerant remains in this part of the circuit, since the pressure of the refrigerant vapor is too low for it to condense in the heat exchanger. This system therefore constitutes a thermal valve, enabling one compartment of a refrigerating unit 1 or 19 to receive cold, without having to return it to the other compartment when the operation is reversed. When said refrigerating unit 1 or 19 functions, the primary circuit of the refrigerating circuit 2 or 23 cools the evaporation devices alternately and each device has a different function: one acts directly as an evaporator, the other functions by heat exchange with the secondary circuit. The evaporating device of the secondary circuit and part of the secondary circuit which acts as evaporator are respectively located in compartments of refrigerating unit 1 or 19 in order to ensure their cooling.

FIG. 1 shows a refrigerating unit 1 comprising two compartments: a refrigerator compartment (5), at a temperature of approximately +5° C., and a freezer compartment (6), at a temperature of approximately −18° C. The refrigerating circuit (2) comprises a primary circuit containing, firstly, connected in series, a motor-compressor (3), a condensor (7), a dehydrator-hydrator (8), a main capillary tube (9), an auxiliary capillary tube (10), a connecting pipe (11), a chamber-shaped evaporator (12), forming part of a heat exchanger, and a return pipe (13) to the motor-compressor, and, secondly, a second evaporator (14) at the main capillary tube outlet, functioning as an ordinary evaporator, connected in parallel with the auxiliary capillary tube (10), and at the inlet to this evaporator an electrovalve (15) which blocks and releases cold generation. The refrigerating circuit also comprises a secondary circuit (16), separate from the main circuit, containing one section (17) acting as a condenser and forming part of the heat exchanger with the first main circuit evaporator (12) and another section (18) acting as evaporator, inside the freezing compartment (6).

When the refrigerating unit 1 is switched on, and the electro-valve (15) on the primary circuit is open, the liquid refrigerant or cold-producing fluid flows into the second evaporator (14), where it evaporates at a temperature of $-10°$ to $-15°$ C. Any excess liquid refrigerant reaches the heat exchanger (12-17) but no cold is transferred to the evaporator side (18), because this is at a temperature of perhaps $-18°$ C. There is almost no flow through the auxiliary capillary tube, because the pressure-drop it causes is much greater than the drop through the evaporator (14). The evaporation temperature of $-10°$ to $-15°$ C. in the evaporation (14) results from the thermal balance obtained in the refrigeration compartment (5), the temperature of which is normally $+5°$ C. with an evaporator (14), with a large surface area, and from the flow-rate in the main capillary tube (9).

When the electro-valve (15) is shut, the evaporator (14) is no longer supplied with cold-producing fluid or refrigerant, which flows in liquid form through the auxiliary capillary tube (10). The circuit consequently functions with the two capillary tubes joined in series, adapted to a lower evaporation temperature than when the only slowing effect comes from the main tube (9). This therefore results in an evaporation temperature of $-25°$ C. for example in the heat exchanger (12-17) so that the freezer compartment is cooled to approximately $-18°$ C. by means of the secondary circuit evaporation section (18).

This description demonstrates that the system can function completely alternately, to produce cold in each evaporator at the temperature at which it will function most efficiently, the temperature of each compartment can be regulated without significantly affecting the regulation of the other, the compressor can be kept in permanent operation, supplying maximum cold to the freezer compartment, while maintaining the right temperature, and the possibility of regulating it, in the other. The refrigerator compartment can also be turned off and the desired temperature maintained in the freezer.

If alternate cold production, with different evaporation temperatures, is to lead to effective energy-saving, an efficient heat exchanger is needed. This new refrigerating unit 1 or 19 therefore preferably comprises a secondary circuit operating by evaporation and condensation, ensuring both high heat-transfer coefficients and good thermosiphon circulation, and a heat exchanger with large inside surface area, on both secondary and primary sides.

Heat exchangers constructed on the principles of this invention ensure such levels of performance. In FIGS. 7 and 8, the exchanger (50) comprises two circuits (12-17 of FIG. 1, 29-34 of FIG. 2), each in tight contact with opposite sides of a heat-exchanger plate (55). The exchanger (50) is composed of three metal plates (54, 55 and 56) sandwiched together, the middle sheet forming the exchange plate (55), and each outer plate (54 and 56) being shaped in such a way as to form a primary and secondary circuit between it and the middle sheet. The refrigerant or cold-producing fluid flows through these circuits.

The circuits (12-17 or 29-34) are honeycomb-type circuits, providing maximum heat-exchange surface area combined with minimum pressure-drop. The circuits face each other, to guarantee the best possible heat exchange. In another embodiment, illustrated in FIGS. 9 and 10, the circuits (12-17 or 29-34) contain circulation channels (57) over the whole or part of the exchanger surface. The circuits remain symmetrical in relation to the exchange plate (55), and therefore facing or offset to a certain degree; the primary circuit (12 or 29) may contain channels (57) and the secondary circuit (17 or 34) may be of the honeycomb type. This embodiment is in no way restricted to the version illustrated in FIG. 8.

The exchanger (50) may also consist of two plates each containing a separate circuit, which are then assembled mechanically, to establish proper thermal contact between them.

The exchanger can be constructed by various methods, but preferably either by the "Roll Bond" process or by the "Z Bond" process. The Roll Bond process consists of bonding superimposed sheets of aluminium together by rolling. After rolling, the circuits are inflated by means of a high-pressure liquid, which forms the circuits by pushing the sheets apart wherever they are not bonded.

In the Z Bond process, aluminium sheets which have previously been coated with a thin sheet of zinc by rolling are welded together. The circuits are stamped into these sheets, which are then placed in a press with heated plates, with the same shape as the circuits. The heat melts the zinc, bonding the sheets together, which are then left to cool. In another embodiment, the exchanger may be constructed from stamped sheets of steel or another metal, which are bonded together by resistance welding, either by spot welding or seam welding when linear welds are needed, for example round the edges of the circuits. A welding torch can also be used to bond the three sheets by fusing the edges.

In yet another embodiment, the exchanger plates can be assembled by brazing in which case they are first coated with a thin layer of copper and then heated overall.

In another embodiment, illustrated in FIGS. 11 and 12, the exchanger (50) is in the form of a coil (58), consisting of a dual tube (59) bent in an accordeon shape, and forming the primary and secondary refrigerant circuits 12-17 or 29-34. This dual tube may be of extruded aluminium.

Finally, in another embodiment illustrated in FIGS. 13, 14 and 15, the exchanger is in the form of a coil (60), consisting of two concentric tubes (61 and 62) bent in an accordeon shape, and forming the primary and secondary refrigerant circuits (12-17 or 29-34). They are made from aluminium or another metal, and have either the simple shape shown in FIG. 14, or the composite shape shown in FIG. 15. When the composite shape is adapted, the space between the tubes contains internal fins.

In a second embodiment of the refrigerating unit as illustrated in FIG. 2, the refrigerator (19) also contains two compartments: a refrigerator compartment (20) at a temperature of approximately $+5°$ C., and a freezer compartment (21) at a temperature of approximately $-18°$ C. The refrigerating circuit (23) comprises a primary circuit containing, connected in series, a motor-compressor (24), a condenser (25), and a device to block and release cold generation, in the form of a refrigerant or cold-producing fluid trap chamber (26), connected in a cul-de-sac position, at the condenser outlet, a filter-dehydrator (27), a capillary tube (28), a chamber-shaped evaporator (29) forming part of a heat exchanger, a connecting pipe (30), a second evaporator (31), functioning as an ordinary evaporator in the refrigerator compartment (20), and a return pipe (32) to the motor-compressor (24). The circuit also comprises a secondary circuit (33), separate from the main circuit, and containing one section (34), acting as a condenser and forming part of the heat exchanger the first main circuit evaporator, and another section (35) acting as evaporator, inside the freezer compartment (21).

The position of the trap (26) enables it to avoid the heating effect of the condenser (25), and to descend rapidly to near atmospheric temperature. It is accompanied by an electric heating resistance (36). When this resistance is not switched on, the trap fills normally with liquid refrigerant from the condenser (25), the trap and its heating resistance thereby constituting a blocking device.

The primary circuit is filled with enough refrigerant so that, when the heating resistance (36) is not switched on, there is sufficient fluid for the evaporator forming part of the heat exchanger (29-34), but not enough for the second evaporator (31).

Consequently, when the trap (26) is not heated, there is not enough liquid refrigerant or cold-producing fluid in the primary circuit to supply the second evaporator (31), and cold is generated only in the heat exchanger (29-34) where, since the secondary circuit presents a lower thermal load, the refrigerant or cold-producing fluid evaporates at −25° C., for example. The freezer compartment (21) is cooled by the evaporator section (33) of the secondary circuit (35). When the trap (26) is heated, the refrigerant or cold-producing fluid is expelled from it, so that there is enough fluid in the primary circuit to supply the second evaporator (31), where, since the thermal load is relatively higher, the cold-producing fluid evaporates at a much higher temperature. Consequently, no cold is transferred through the heat exchanger (29-34) to the secondary circuit (33) and to its evaporation section inside the freezer compartment (21) which is at a lower temperature than the evaporation temperature, for example −20° C.

The primary circuit (2 or 23) of the unit illustrated in FIGS. 1 and 2, contains two evaporators. Under normal operating conditions, the evaporator (14 or 31) in the refrigerator compartment at +5° C. functions at a higher temperature, for example −10° to −15° C. while the evaporator (12 or 29) forming part of the heat exchanger functions at a lower temperature, for example −20° to −30° C.; the secondary circuit evaporator (18 or 35) functions at −15° to −25° C., for example.

In such a refrigerating circuit, comprising a primary circuit with several evaporators, functioning either as an ordinary evaporator or as part of a heat exchanger, and a secondary circuit exchanging heat with the primary circuit through the heat exchanger, the primary circuit may use any other system for alternating generation of cold in the compartments than a trap (26 on FIG. 2) or an electro-valve (15 on FIG. 1) such as a throttle, equipped with a heating device.

Alternation of the generation of cold by the refrigerating circuit is controlled by thermostats, in order to keep compartment temperatures relatively constant.

Figure 3:
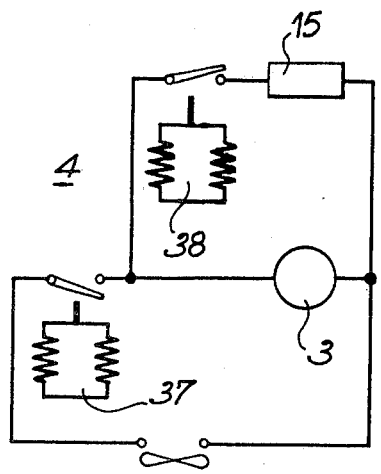
FIG. 3, showing a diagram of an electrical circuit to control temperature regulation in the compartments of the refrigerator illustrated in FIG. 1.

Temperatures in the two compartments of the refrigerating unit illustrated in FIGS. 1 or 2 may be regulated by two thermostats, the sensing units of which are in thermal contact with the evaporators in these compartments. FIG. 3 illustrates an electrical circuit (4) to control alternation of cold generation in the two compartments. This circuit is made up of two parts: the first part comprising a thermostat (37) connected in a series, with the motor-compressor (3) to the terminal of a power supply, and the sensing unit of which (not shown here) is in close thermal contact with the refrigerator compartment evaporator, and the second part comprising a combination of an opening electro-valve (15) (i.e. which is open when energized) and a thermostat (38) connected in series, the combination being connected in parallel to the terminals of the motor-compressor (3), and the sensing unit of the thermostat (not shown here) is in close thermal contact with the freezer compartment evaporator (18).

The thermostat (37) in the first part of the circuit is a closing thermostat (i.e. in which the contacts are closed by bellows pressure), and with a constant resetting temperature, for example +3° to +5° C., which restarts the motor-compressor (3) only when the refrigerator compartment evaporator (14) is defrosted: this ensures cyclic and thereby automatic defrosting of this evaporator.

The same thermostat (37) also controls the second part of the circuit (4), containing the thermostat (38) and electro-valve (15), connected in series. This thermostat is an opening thermostat (i.e. in which contacts are opened by bellows pressure), so that it closes the contacts when the predetermined temperature in the freezer compartment (6) is obtained, switching on the electro-valve (15), which opens, admitting liquid refrigerant or cold-producing fluid into the refrigerator compartment evaporator (14). This is the crossed regulation system. The freezer compartment (6) takes priority until the right temperature is reached. It then closes the electro-valve and cold is generated in the refrigerator compartment (5). When the right temperature is achieved in this compartment, the thermostat (37) cuts out and stops the motor-compressor (3). Defrosting takes place in the conventional way. This unit does not require any resistance to achieve thermal balance, since the two thermostats provide this automatically.

When defrosting is completed, the thermostat (37) restarts the motor-compressor (3). The other thermostat (38) normally also heats opens its contacts, and consequently closes the electro-valve (15).

Cold is thereupon generated in the freezer compartment (6), and the cycle resumes. If the thermostat (38) has not yet closed the electro-valve, cold is first generated in the refrigerator compartment (5), the freezer compartment (6) taking over as soon as its thermostat (38) indicates the need for cold, and the refrigerator compartment (5) being cooled subsequently.

When the refrigerator (1) is switched on, the freezer compartment (6) is cooled first, and the refrigerator compartment (5) second.

This quite simple regulation system is suitable for refrigerators comprising two compartments, in which the volume of the freezer compartment does not exceed about one third of the total volume of both compartments. This is because of the priority enjoyed by the freezer compartment: if its cold demand rose inordinately, it might consume all the cold produced, to the detriment of the other compartment, and this would be inacceptable. This regulation system (4), although it has the advantage of being simple, neither allows the refrigerator compartment to be switched off, nor continuous cooling of the freezer. However, it offers fully separate regulation of compartments, saves energy, and allows the freezer temperature to be lowered to less than −18° C., to −25° C., for example, by regulating the thermostat (38).

Figure 4:
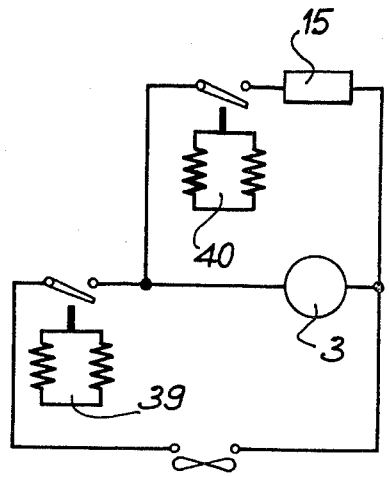
FIG. 4, showing a diagram of a second embodiment of the electrical circuit illustrated in FIG. 3.

FIG. 4 shows a second embodiment of the electrical circuit controlling generation of cold, in which the thermostats are inversed, in comparison with the example shown in FIG. 3. The motor-compressor (3) is controlled by the freezer compartment thermostat (39), and the refrigerator compartment thermostat (40) is connected in series with the electro-valve (15), which is an opening valve, whereas both thermostats are of the closing type. The refrigerator compartment is defrosted in the same way, its thermostat (40) having a constant resetting temperature, as in the example shown in FIG. 3.

In this second embodiment, regulation is no longer crossed, and the refrigeration compartment (5) takes priority. The motor-compressor (3) starts up when the freezer compartment (6) requires cold. If the refrigerator compartment (5) also requires cold, its thermostat (40) closes, the electro-valve (15) opens, and cold is generated in the refrigerator compartment. When it is at the right temperature, the thermostat (40) opens, closing the electro-valve (15), and cold is generated in the freezer compartment (6), until the right temperature is attained there.

For cold-storage purposes, when the thermal load is normal, the motor-compressor (3) stops, and the cycle resumes. For freezing purposes, the thermal load of the freezer compartment (6) may extend the cycle, so that the refrigerator compartment thermostat (40) may close again before the freezer thermostat (39) opens. In any case, the result is the same.

This other embodiment of the electrical circuit allows the temperature of both compartments (5 and 6) of the refrigerator to be regulated separately, saves energy, and provides the possibility of keeping the motor-compressor in permanent operation, generating maximum cold in the freezer compartment, and of turning the refrigerator compartment off. This embodiment remains simple, and is suitable for refrigerators comprising two compartments, and with a large freezer. In such circumstances, the priority given to the refrigerator compartment is in no danger of causing overloads, since its volume is relatively small in relation to the total volume of the two compartments: any such overloading would result in no cold being generated in the freezer compartment during the period involved, which would hardly be acceptable.

Figure 5:
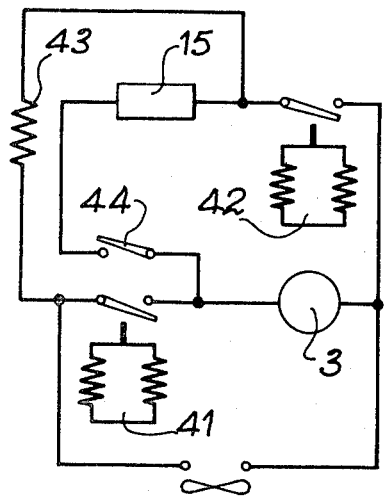
FIG. 5, showing a diagram of a third embodiment of the electrical circuit illustrated in FIG. 3.

FIG. 5 shows a third embodiment of the electrical circuit controlling generation of cold, in which the circuit has the same type of connections as in the embodiment illustrated in FIG. 4: in other words, the refrigerator compartment takes priority. This circuit is made up of three parts. The first part comprises the freezer compartment thermostat (41), connected in series with the motor-compressor (3) to the terminals of a power supply. The second part comprises a combination of refrigeration compartment thermostat (42), the electro-valve (15) and an auxiliary contact (44) on the freezer thermostat (41), these components being connected in series and the combination of them being connected in parallel to the terminals of the motor-compressor (3). The third part comprises a heating resistance (43), connected in series with the refrigerator compartment thermostat (42), to the power supply terminals. When this resistance (43) is energized it heats the bulb of the freezer thermostat (41), making it possible to start up the motor-compressor (3) when the refrigerator compartment requires cold, without the other thermostat (41) having closed, and thereby preventing the refrigerator compartment (5) from remaining unsupplied with cold for too long, when the freezer compartment (6) is engaged on a long cycle.

The auxiliary contact (44) on the freezer thermostat (41) is an opening contact, not a closing contact like the main one: it opens the circuit when the thermostat (41) heats above the normal main contact closing temperature. Opening of the auxiliary contact breaks the electro-valve circuit, so that cold is again generated in the freezer compartment (6).

In other words, the auxiliary contact (44) restores priority to the freezer compartment as soon as this heats above its normal temperature.

When lengthy freezing takes place, the auxiliary contact might remain open at the start of the cycle, to the detriment of the refrigerator compartment. To prevent this from happening, the switch which turns the motor-compressor on permanently, by means of a contact which short-circuits the contact of the freezer thermostat (41), can be equipped with a second contact, which short-circuits the auxiliary contact (44), cancelling out its effect. These two contacts (not shown here) are operated together by the user, when freezing needs to be done. To summarize this third embodiment, a resistance (43) activates start-up of the motor-compressor (3) when the refrigerator compartment thermostat (42) indicates the need for cold, without the freezer thermostat (41) doing the same, and an auxiliary contact (44) on the freezer thermostat (41) restores priority to it whenever its temperature rises beyond the right level, thereby limiting the effects of overloading of the other compartment. FIG. 5 illustrates one way of combining these two compartments, but they may also be used separately as required, depending on the relative characteristics of the two compartments.

Figure 6:
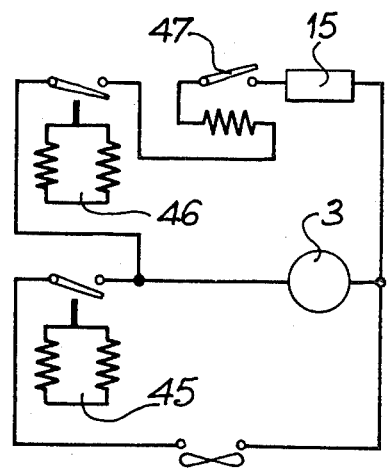
FIG. 6, showing a diagram of a fourth embodiment of the electrical circuit illustrated in FIG. 3.

FIG. 6 shows a fourth embodiment of the electrical circuit controlling generation of cold in a refrigeration unit, similar to the second embodiment illustrated in FIG. 4. This fourth embodiment is made up of two parts: the first comprising the freezer thermostat (45) connected in series with the motor-compressor (3) to the terminals of a power supply, and the second part comprising a combination of the refrigeration compartment thermostat (46), a cyclic device (47), consisting of a switch, delayed-action opening of which is controlled by current passing through it, and an electric-valve (15), these components being connected in series, and the combination being connected in parallel to the motor-compressor terminals. The cyclic device (47) may consist of a bimetallic strip, with a heating resistance through which current circulating in the device passes. Its function is to restrict the priority given to the refrigerator compartment. Instead of being based, as in the third embodiment, on overheating of the freezer compartment, it is done by deliberately limiting the operating time apportioned to the refrigerator compartment, by means of a cyclic device (47) consisting of a normally closed switch, comprising a bimetallic strip heated by resistance through which current circulating in the device passes. After a lapse of time, the length of which depends on the selected propreties of the bimetallic strip and resistance, the cyclic device cuts out, its bimetallic strip coolds, closing the contact agin, after a lapse of time that also depends on the characteristics of the strip and resistance.

When the refrigerator is functioning normally, with no overloads, this fourth embodiment functions in the same way as the second embodiment; the freezer thermostat (46) opens before the cyclic device (47) comes into operation. If the system is overloaded, however, the cyclic device comes inot play, dividing the supply of cold arbitrarily between the two compartments, in a ration determines by the characteristics of the cyclic device. This procedure prevents the harmful effects of overloading, by temporarily abandoning independent temperature regulation in favor of arbitrary distribution, as in a conventional refrigerator. However, in this case it occurs only in exceptional circumstances.

The heat-operated cyclic device described here is appropriate for the purpose, since it returns automatically to its original position once current is switched off. But other similar devices, such as a switch controlled by an electronic cyclic device, or any other system ensuring that the device returns to its original position, can be used.

Improvements in the second embodiment of the electrical circuit 4, such as those designed to cope with the problem of overloading, described in the third and fourth embodiments, can be applied to the circuit. This circuit and the embodiments illustrated as examples in FIGS. 3 to 6 can also be used to control the alternation of cold generation in the compartments (20 and 21) of the refrigeration unit illustrated in FIG. 2, in which case the blocking device consisting of an electro-valve (15) in the circuit (4) is replaced by the refrigerant trap (26) with its heating resistance.

Other improvements may also be made in control of the refrigerating unit, such as a selector switch, operated by the user to change from the first embodiment of the circuit (4), to suit circumstances.

The main functions performed by the third and fourth embodiments, namely independent regulation of compartment temperatures, intensified functioning of the freezer compartment, compensation for temporary thermal overloads, switching-off the refrigerator compartment, can also be performed by an electronic device known in the previous art, comprising a thermometer in each compartment of the refrigerating unit (1). This device initiates start-up of the motor-compressor to meet the cold requirements of each compartment. Since it is possible for one compartment to require cold when the motor-compressor has just been switched off by the other compartment, a delaying device has to be added to allow pressures to become balanced; this is essential in a cooling circuit conatinging a capillary tube.

Such an electronic device can also control operation with shorter cycles, to meet the need to defrost the refrigerator compartment. It is advisable to give priority to the refrigerator compartment when the compressor starts up, so that cold can continue to be generated in the freezer compartment while the refrigerator compartment is being defrosted.

The same device can also be responsible for optimum distribution of cold between compartments, to cope with temperary thermal overloads.

What is claimed is:

1. A refrigeration unit comprising compartments at different temperatures, controlled by separate thermostatic devices, and cooled by a refrigerant circuit comprising a pressure-reducing capillary tube, and a single motor-compressor, characterized by the fact that it comprises a primary circuit of the type with expansion by capillary tube, with at least one evaporator functioning as an ordinary evaporator to cool at least one compartment at a higher temperature, known as the refrigerator compartment, and another evaporator forming part of a heat exchanger, to cool a compartment at a lower temperature, known as the freezer compartment, through a secondary circuit with a condenser and an evaporator, the condenser of which forms the heat exchanger with the second primary circuit evaporator, within which a refrigerant or cold-producing fluid circulates, and the evaporator of which is situated in the freezer compartment, in such a way as to produce a thermal valve effect, allowing heat to be transferred when the heat exchanger evaporator is at a lower temperature than the freezer compartment, and otherwise preventing any heat transfer, and comprises at least one device to block and release cold generation in the refrigerator compartment or compartments, the blocking state halting cooling of the refrigerator compartment or compartments, and thereby allowing cooling of the freezer compartment, while the releasing state allows cooling of the refrigerator compartment or compartments, halting cooling of the freezer compartment.

2. A unit as defined in claim 1, characterized by the fact that it comprises a refrigerator compartment, cooled by an evaporator, a primary circuit passing through a heat exchanger, and an accompanying secondary circuit, with a condenser and an evaporator, providing a thermal valve effect, and several refrigerator compartments, possibly at different temperatures, each cooled by an evaporator, containing a device to block and release generation of cold.

3. A unit as defined in claim 1, comprising two compartments, and in which the primary circuit of the refrigerant circuit comprises a motor-compressor, a condenser and a filter-dehydrator, connected in series, characterized by the fact that the said primary circuit further comprises, firstly, connected in series with the motor-compressor, condensor and filter-dehydrator, a main capillary tube, an auxiliary capillary tube, one chamber-shaped evaporator forming part of a heat exchanger with the condenser of a secondary circuit, comprising the said condenser and an evaporator, which cools the freezer compartment, and, connected in parallel with the auxiliary capillary tube, a second evaporator, which cools the refrigeration compartment, and secondly, a device to block and release generation of cold, in the form of an electro-valve, situated at the second primary circuit evaporator inlet.

4. A unit as defined in claim 1, comprising two compartments, and in which the primary circuit of the refrigerant circuit comprises a motor-compressor, a condensor, a filter-dehydrator and a capillary tube, connected in series, characterized by the fact that said primary circuit further comprises, first, connected in series with the motor-compressor, condenser, filter-dehydrator and capillary tube, one chamber-shaped evaporator, forming part of a heat exchanger with a condensor of a secondary circuit, comprising said condenser and an evaporator, which cools the freezer compartment, and a second evaporator which cools the refrigerator compartment, and, secondly, connected in a cul-de-sac position at the condenser outlet, a device to block and release generation of cold, in the form of a refrigerant trap chamber, equipped with a heating resistance.

5. A unit defined in either one of claims 3 or 4, comprising two compartments at different temperatures, separately regulated, characterized by the fact that it comprises an electrical regulation circuit to alternate generation of cold in the two compartments, giving priority to the freezer compartment, and made up of two parts, the first part comprising a closing thermostat, with constant resetting temperature, in the freezer compartment, connected in series with the motor-compressor to the terminals of a power supply, and the second part comprising a combination of a cold-generation blocking and release device connected in series with an opening thermostat in the refrigerator compartment, the combination being connected in parallel to the motor-compressor terminals.

6. A unit as defined in either one of claims 3 or 4, comprising two compartments at different temperatures, separately regulated, characterized by the fact that it comprises an electrical regulation circuit to alternate generation of cold in the two compartments, giving priority to the refrigeration compartment, and made up of two parts, the first part comprising a closing thermostat in the freezer compartment, connected in series with the motor-compressor to the terminals of a power supply, and the second part comprising a combination of the cold-generation blocking and release device connected in series with a closing thermostat in the refrigerator compartment, the combination being connected in parallel to the motor-compressor terminals.

7. A unit as defined in either of claims 3 or 4, containing two compartments at different temperatures, separately regulated, characterized by the fact that it comprises an electrical regulation circuit to alternate generation of cold in the two compartments, giving limited priority to the refrigerator compartment, and made up of three parts, the first part comprising a closing thermostat in the freezer compartment, connected in series with the motor-compressor to the terminals of a power supply, a second part comprising a combination of a closing thermostat in the refrigerator compartment, the cold-generation blocking and release device, and an auxiliary opening contact on the freezer compartment thermostat, these components being connected in series, and the combination being connected in parallel to the motor-compressor terminals, and the third part comprising a combination of the refrigerator compartment thermostat connected in series with a resistance to heat the freezer compartment thermostat bulb, the combination being connected in parallel to the power supply terminals.

8. A unit as defined in claim 7, in which the electrical regulation circuit comprises a switch, connected in parallel to the auxiliary contact terminals, and operation of which is concomitant with the start of continuous cold generation in the freezer compartment, for freezing purposes.

9. A unit as defined in either of claims 3 or 4, comprising two compartments at different temperatures, separately regulated, characterized by the fact that it comprises an electrical regulation circuit to alternate generation of cold in the two compartments, giving limited priority to the refrigerator compartment, and made up of two parts, the first part containing a closing thermostat in the freezer compartment, connected in series with the motor-compressor to the terminals of a power supply, and the second part comprising a combination of a closing thermostat in the refrigerator compartment, a cyclic device consisting of a switch, delayed-action operation of which is controlled by current circulating through the device, and a cold-generation blocking and release device, these components being connected in series, and the combination being connected in parallel to the motor-compressor terminals.

10. A unit as defined in claim 9, comprising a cyclic device consisting of a bimetallic strip switch with heating resistance, controlled by current circulating in the device.

11. A unit as defined in claim 9, in which the cyclic device comprises a switch activated by an electronic cyclic device.

12. A unit as defined in either of claims 1 and 2, in which the electrical regulation circuit to alternate cold generation in the compartments comprises an electronic device for separate regulation of compartment temperatures, intensified cold generation in the freezer compartment, readjustment of temporary thermal overloads, and switching-off of the refrigerator compartment alone.

13. A unit as defined in claim 1, comprising a heat exchanger, composed of an evaporator on the primary circuit and a condenser on the secondary circuit, each in tight contact with opposite sides of a heat-exchange plate.

14. A unit as defined in claim 13, in which the heat exchanger is composed of three metal plates sandwiched together, each outer plate being shaped in such a way as to form a circuit between it and the middle sheet for the refrigerant flow.

15. A unit as defined in either one of claims 13 and 14, in which at least one of the primary and secondary circuits is of the honeycomb type.

16. A unit as defined in either one of claims 13 and 14, in which at least one of the primary and secondary circuits in the heat exchanger comprises circulating channels extending over at least part of the heat exchanger surface.

17. A unit as defined in claim 13, comprising a heat exchanger in the form of a coil, consisting of a dual tube bent in an accordeon shape, and forming the primary and secondary refrigerant circuits.

18. A unit as defined in claim 13, comprising a heat exchanger in the form of a coil, consisting of two concentric tubes, bent in an accordeon shape, and forming the primary and secondary refrigerant circuits.

19. A unit as defined in claim 18, in which the concentric tubes are separated by fins.

* * * * *